US012605773B2

(12) United States Patent  
Makiuchi

(10) Patent No.: US 12,605,773 B2  
(45) Date of Patent: Apr. 21, 2026

(54) DRILL AND CUTTING METHOD

(71) Applicant: Sumitomo Electric Hardmetal Corp., Itami (JP)

(72) Inventor: Yusuke Makiuchi, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 540 days.

(21) Appl. No.: 18/024,306

(22) PCT Filed: Jun. 29, 2022

(86) PCT No.: PCT/JP2022/025935  
§ 371 (c)(1),  
(2) Date: Mar. 2, 2023

(87) PCT Pub. No.: WO2024/004075  
PCT Pub. Date: Jan. 4, 2024

(65) Prior Publication Data  
US 2024/0307979 A1 Sep. 19, 2024

(51) Int. Cl.  
B23B 51/02 (2006.01)  
B23B 35/00 (2006.01)

(52) U.S. Cl.  
CPC .............. B23B 51/02 (2013.01); B23B 35/00 (2013.01); B23B 2251/122 (2013.01); B23B 2251/125 (2013.01)

(58) Field of Classification Search  
CPC ................ B23B 51/02; B23B 2251/12; B23B 2251/122; B23B 2251/125; B23B 2251/127  
See application file for complete search history.

(56) References Cited

U.S. PATENT DOCUMENTS

| | | | |
|---|---|---|---|
| 2006/0039767 A1* | 2/2006 | Yamamoto | B23B 51/02 408/230 |
| 2017/0028481 A1 | 2/2017 | Sato et al. | |
| 2020/0238469 A1* | 7/2020 | Guter | B23B 27/16 |
| 2021/0291279 A1 | 9/2021 | Noshiro et al. | |

FOREIGN PATENT DOCUMENTS

| | | | | |
|---|---|---|---|---|
| DE | 102005003496 A1 | 7/2006 | | |
| DE | 102013212122 A1* | 1/2014 | | B23P 15/32 |
| EP | 0127009 B2* | 6/1993 | | B23B 51/02 |

(Continued)

OTHER PUBLICATIONS

Extended European Search Report issued Aug. 20, 2025 in counterpart European Application No. 22949350.7, 10 pages.

(Continued)

*Primary Examiner* — Eric A. Gates  
(74) *Attorney, Agent, or Firm* — XSENSUS LLP

(57) ABSTRACT

A drill includes a flank face, a rake face, and a main cutting edge on a ridgeline between the rake face and the flank face. The main cutting edge has a first curved portion having a curved shape contiguous with the flank face and a second curved portion having a curved shape contiguous with the rake face in a sectional view orthogonal to an extending direction of the main cutting edge. A first curvature radius of the first curved portion is larger than a second curvature radius of the second curved portion.

4 Claims, 9 Drawing Sheets

(56)           References Cited

FOREIGN PATENT DOCUMENTS

| JP | 9-500335 | A | 1/1997 |
| JP | H11-114713 | A | 4/1999 |
| JP | 2002-370107 | A | 12/2002 |
| JP | 2007-7809 | A | 1/2007 |
| JP | 2014-8549 | A | 1/2014 |
| JP | 2015-123552 | A | 7/2015 |
| JP | 2016-175141 | A | 10/2016 |
| JP | 2017-019094 | A | 1/2017 |
| WO | 95/13894 | A1 | 5/1995 |
| WO | 2020/075698 | A1 | 4/2020 |

OTHER PUBLICATIONS

Rodriguez, "Cutting edge preparation of precision cutting tools by applying micro-abrasive jet machining and brushing", Apr. 17, 2009, 205 pages, XP093200279.

* cited by examiner

DRILL AND CUTTING METHOD

CROSS-REFERENCE TO RELATED APPLICATION

The present application is based on PCT filing PCT/JP2022/025935, filed Jun. 29, 2022, the entire contents of which are incorporated herein by reference.

TECHNICAL FIELD

The present disclosure relates to a drill and a cutting method.

BACKGROUND ART

Japanese Patent Laying-Open No. 2007-007809 (PTL 1) discloses a drill. The drill disclosed in PTL 1 has a flank face, a rake face, and a cutting edge on a ridgeline between the flank face and the rake face. The cutting edge includes a negative land.

Japanese Patent Laying-Open No. 2014-008549 (PTL 2) discloses a drill. The drill disclosed in PTL 2 has a flank face, a rake face, and a cutting edge on a ridgeline between the flank face and the rake face. The cutting edge has a first curved portion having a curved shape contiguous with the flank face and a second curved portion having a curved shape contiguous with the rake face in a sectional view orthogonal to an extending direction of the cutting edge. A curvature radius of the first curved portion is smaller than a curvature radius of the second curved portion.

CITATION LIST

Patent Literature

PTL 1: Japanese Patent Laying-Open No. 2007-007809
PTL 2: Japanese Patent Laying-Open No. 2014-008549

SUMMARY OF INVENTION

A drill of the present disclosure includes a flank, a rake face, and a main cutting edge on a ridgeline between the rake face and the flank face. The main cutting edge includes a first curved portion having a curved shape contiguous with the flank face and a second curved portion having a curved shape contiguous with the rake face in a sectional view orthogonal to an extending direction of the main cutting edge. A first curvature radius of the first curved portion is larger than a second curvature radius of the second curved portion.

BRIEF DESCRIPTION OF DRAWINGS

FIG. 2 is a front view of drill 100 as viewed from a front end 100a.

DETAILED DESCRIPTION

Figure 1:
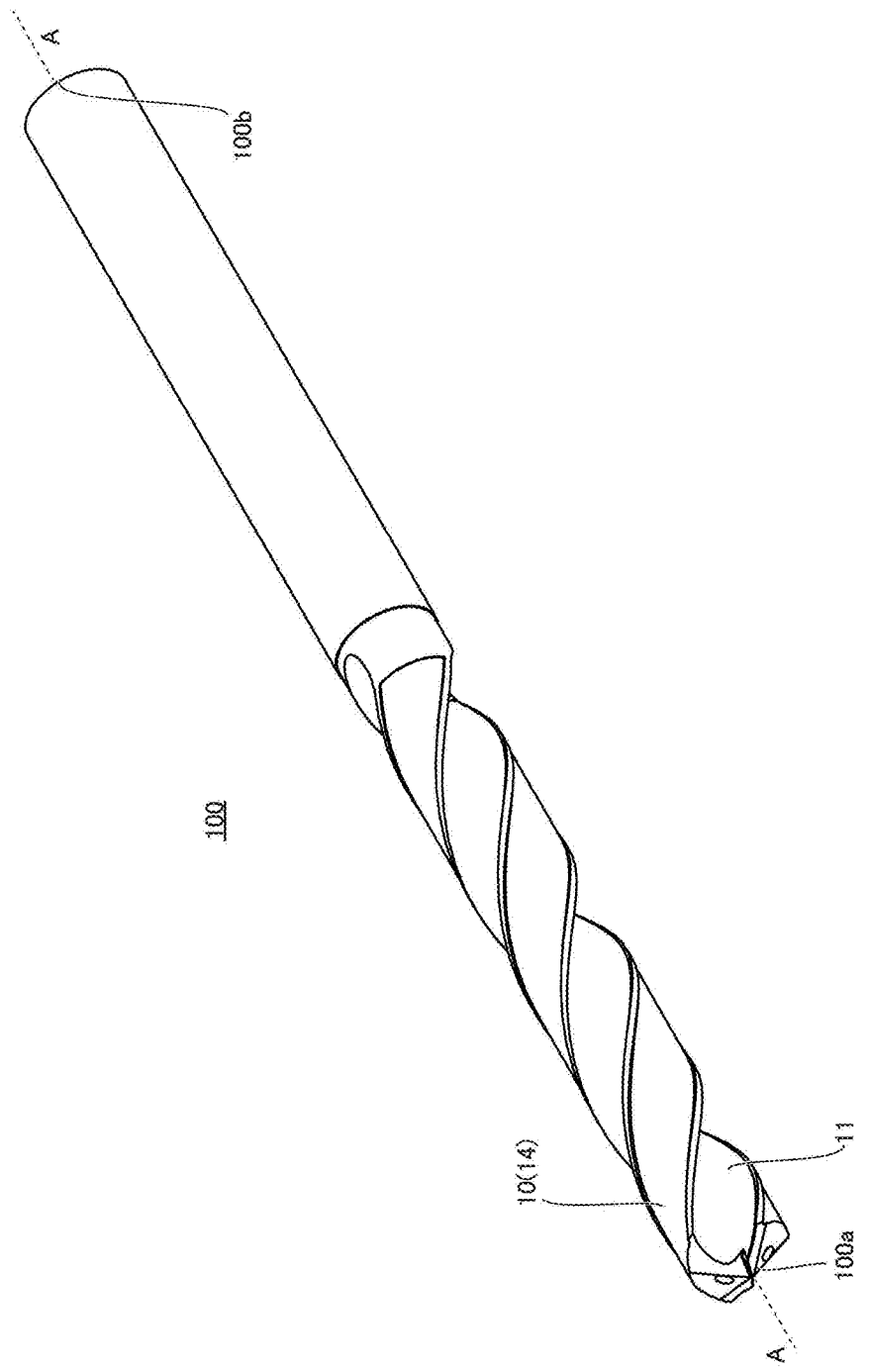
FIG. 1 is a perspective view of a drill 100.

Problem to be Solved by the Present Disclosure

In the drill disclosed in PTL 1, a portion where the negative land and the flank face are contiguous and a portion where the negative land and the rake face are contiguous form a new corner, and therefore strength of the cutting edge is insufficient under a cutting condition of a high load. In the drill described in PTL 2, chipping is likely to occur on the flank face under a condition of high feed (cutting condition that a feed rate per edge for an edge diameter of the drill increases).

The present disclosure has been made in view of the above problems of the related art. Specifically, the present disclosure provides a drill capable of suppressing occurrence of chipping on a flank face even under a cutting condition of high feed.

Advantageous Effect of the Present Disclosure

The drill of the present disclosure can suppress occurrence of chipping on the flank face even under a cutting condition of high feed.

Description of Embodiments

First, embodiments of the present disclosure will be listed and described.

(1) A drill according to an embodiment includes a flank face, a rake face, and a main cutting edge on a ridgeline between the rake face and the flank face. The main cutting edge has a first curved portion having a curved shape contiguous with the flank face and a second curved portion having a curved shape contiguous with the rake face in a sectional view orthogonal to an extending direction of the main cutting edge. A first curvature radius of the first curved portion is larger than a second curvature radius of the second curved portion. The drill according to (1) can suppress occurrence of chipping on the flank face even under a cutting condition of high feed.

(2) In the drill according to (1), the first curvature radius may be 1.5 times or more of the second curvature radius and 0.07 mm or less. The second curvature radius may be 0.02 mm or more and 0.05 mm or less. The drill according to (2) can further suppress occurrence of chipping on the flank face even under a cutting condition of high feed.

(3) In the drill according to (1) or (2), the main cutting edge may further include a connecting portion having a linear shape and contiguous with the first curved portion and the second curved portion in a sectional view orthogonal to the main cutting edge. The drill according to (3) facilitates adjustment of a width for performing cutting edge processing.

(4) In the drill according to (3), the connecting portion may have a width of 0.05 mm or less.

(5) In the drill according to (1) or (2), the main cutting edge may further include a connecting portion having a curved shape contiguous with the first curved portion and the second curved portion in a sectional view orthogonal to the extending direction of the main cutting edge. The connecting portion has a third curvature radius that may be larger than the first curvature radius. The drill according to (5) facilitates adjustment of the width for performing the cutting edge processing.

(6) A cutting method according to an embodiment includes performing cutting processing of a workpiece with a drill. A drill includes a flank face, a rake face, and a main cutting edge on a ridgeline between the rake face and the flank face. The main cutting edge has a first curved portion having a curved shape contiguous with the flank face and a second curved portion having a curved shape contiguous with the rake face in a sectional view orthogonal to an extending direction of the main cutting edge. A first curvature radius of the first curved portion is larger than a second curvature radius of the second curved portion. The cutting processing is performed under a condition that a feed rate per edge of the drill is 5% or more of an edge diameter of the drill. The cutting method according to (6) can suppress occurrence of chipping on the flank face even under a cutting condition of high feed.

Details of Embodiments

Hereinafter, the embodiments of the present disclosure will be described in detail with reference to the drawings. In the drawings described below, the same or corresponding parts are denoted by the same reference signs, and redundant description will not be repeated. The drill according to an embodiments is referred to as a drill 100.

(Configuration of Drill 100)

FIG. 1 is a perspective view of drill 100. As shown in FIG. 1, a center axis of drill 100 is defined as a central axis A. Drill 100 has a front end 100*a* and a rear end 100*b* in a direction of central axis A. Rear end 100*b* is an end opposite to front end 100*a*. Drill 100 includes, for example, cemented carbide. The cemented carbide is a sintered material of metal carbide particles containing a binder. The metal carbide particles are, for example, tungsten carbide (WC) particles, and the binder is, for example, cobalt (Co).

Figure 2:
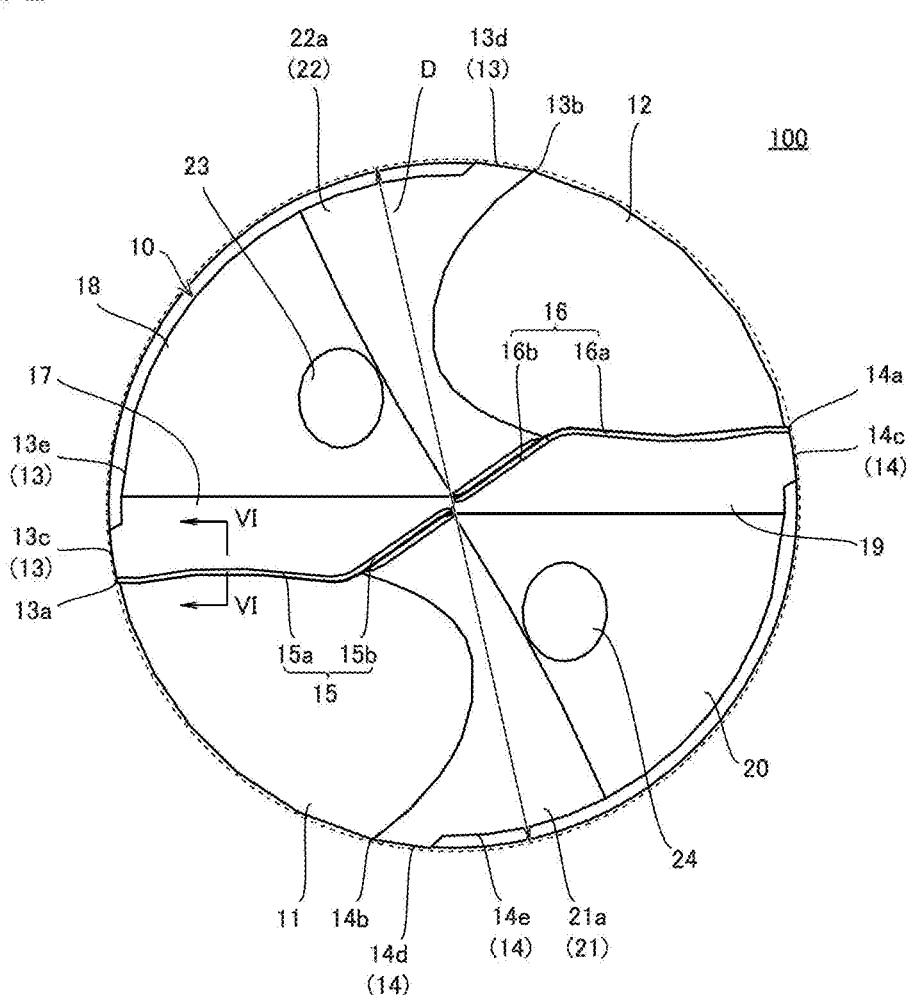
Figure 3:
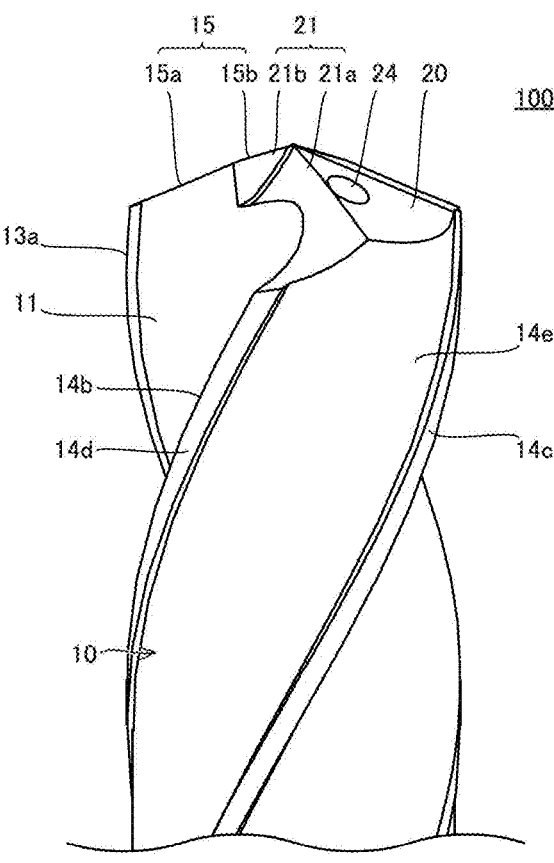
FIG. 3 is a first enlarged side view of drill 100.
Figure 4:
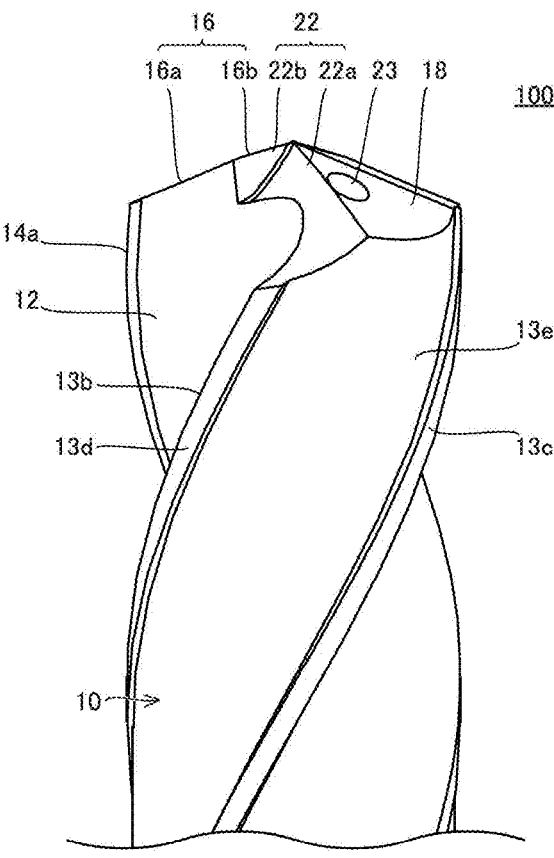
FIG. 4 is a second enlarged side view of drill 100.

FIG. 2 is a front view of drill 100 as viewed from front end 100*a*. FIG. 3 is a first enlarged side view of drill 100. FIG. 4 is a second enlarged side view of drill 100. As shown in FIGS. 1 to 4, drill 100 has an outer peripheral face 10. A flute 11 and a flute 12 are formed on outer peripheral face 10. Flute 11 and flute 12 extend in a helix around central axis A from front end 100*a* toward rear end 100*b*. Flute 11 and flute 12 are flutes for discharging chips cut out by a cutting edge 15 and a cutting edge 16 described later.

Outer peripheral face 10 includes a land 13 and a land 14. Land 13 is a part of outer peripheral face 10 between flute 11 and flute 12. Land 14 is a part of outer peripheral face 10 between flute 11 and flute 12, the part being different from land 13. An end of land 13 closer to flute 11 is referred to as a leading edge 13*a*, and an end of land 13 closer to flute 12 is referred to as a heel 13*b*. An end of land 14 closer to flute 12 is referred to as a leading edge 14*a*, and an end of land 14 closer to flute 11 is referred to as a heel 14*b*.

Land 13 includes a main margin 13*c*, a sub margin 13*d*, and a body clearance 13*e*. Main margin 13*c* is at an end of land 13 closer to leading edge 13*a*. Sub margin 13*d* is at an end of land 13 closer to heel 13*b*. Main margin 13*c* and sub margin 13*d* protrude from body clearance 13*e* outward in a radial direction. That is, there is a step at a boundary between main margin 13*c* and body clearance 13*e* and a boundary between sub margin 13*d* and body clearance 13*e*.

Land 14 includes a main margin 14*c*, a sub margin 14*d*, and a body clearance 14*e*. Main margin 14*c* is at an end of land 14 closer to leading edge 14*a*. Sub margin 14*d* is at an end of land 14 closer to heel 14*b*. Main margin 14*c* and sub margin 14*d* protrude from body clearance 14*e* outward in a radial direction. That is, there is a step at a boundary between main margin 14*c* and body clearance 14*e* and a boundary between sub margin 14*d* and body clearance 14*e*.

Drill 100 has a cutting edge 15 and a cutting edge 16 on a side closer to front end 100*a*. Cutting edge 15 extends from an end of leading edge 13*a* closer to front end 100*a* toward central axis A in a front view as viewed from front end 100*a*. Cutting edge 16 extends from an end of leading edge 14*a* closer to front end 100*a* toward central axis A in a front view as viewed from front end 100*a*.

Cutting edge 15 includes a main cutting edge 15*a* and a thinning cutting edge 15*b*. Main cutting edge 15*a* is a part of cutting edge 15 extending from an end of leading edge 13*a* closer to front end 100*a*. Flute 11 is contiguous with main cutting edge 15*a* from a side opposite to a first flank face 17 described later. From another point of view, main cutting edge 15*a* is on a ridgeline between flute 11 and first flank face 17, and a part of flute 11 contiguous with main cutting edge 15*a* is a rake face of main cutting edge 15*a*. Thinning cutting edge 15*b* is a part of cutting edge 15 extending from an end of main cutting edge 15*a* opposite to leading edge 13*a*.

Cutting edge 16 includes a main cutting edge 16*a* and a thinning cutting edge 16*b*. Main cutting edge 16*a* is a part of cutting edge 16 extending from an end of leading edge 14*a* closer to front end 100*a*. Flute 12 is contiguous with main cutting edge 16*a* from a side opposite to a first flank face 19 described later. From another point of view, main cutting edge 16*a* is on a ridgeline between flute 12 and first flank face 19, and a part of flute 12 contiguous with main cutting edge 16*a* is a rake face of main cutting edge 16*a*. Thinning cutting edge 16*b* is a part of cutting edge 16 extending from an end of main cutting edge 16*a* opposite to leading edge 14*a*.

Drill 100 further includes the first flank face 17, a second flank face 18, the first flank face 19, a second flank face 20, a thinning face 21, a thinning face 22, an oil hole 23, and an oil hole 24 on a side closer to front end 100*a*.

First flank face 17 is contiguous with cutting edge 15. Second flank face 18 is contiguous with first flank face 17 from a side opposite to cutting edge 15. First flank face 19 is contiguous with cutting edge 16. Second flank face 20 is contiguous with first flank face 19 from a side opposite to cutting edge 16.

Tinning face 21 and thinning face 22 are faces formed to reduce a core thickness of drill 100 at front end 100*a* (faces formed by thinning front end 100*a*). In an example shown in FIGS. 1 to 4, thinning face 21 and thinning face 22 are faces formed by performing X-shaped thinning on front end 100*a*.

Thinning face 21 has a thinning heel face 21*a* and a thinning rake face 21*b*. Thinning heel face 21*a* is contiguous with flute 11 and second flank face 20. That is, thinning heel face 21*a* is a part of thinning face 21 closer to heel 14*b*. Thinning rake face 21*b* is contiguous with cutting edge 15 from a side opposite to first flank face 17. That is, thinning cutting edge 15*b* is on a ridgeline between first flank face 17 and thinning rake face 21*b*.

Thinning face 22 has a thinning heel face 22*a* and a thinning rake face 22*b*. Thinning heel face 22*a* is contiguous with flute 12 and second flank face 18. That is, thinning heel face 22*a* is a part of thinning face 22 closer to heel 13*b*. Thinning rake face 22*b* is contiguous with cutting edge 16 from a side opposite to first flank face 19. That is, thinning cutting edge 16*b* is on a ridgeline between first flank face 19 and thinning rake face 22*b*.

Figure 5:
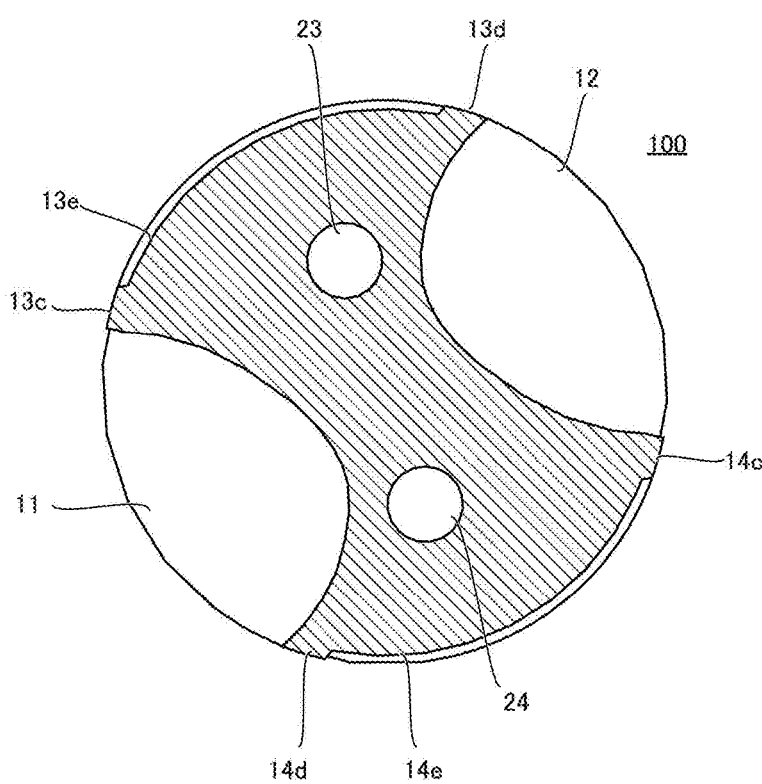
FIG. 5 is a sectional view of drill 100 orthogonal to a central axis A.

FIG. 5 is a sectional view of drill 100 orthogonal to central axis A. As shown in FIG. 5, oil hole 23 and oil hole 24 are formed inside drill 100. Oil hole 23 is opened in second flank face 18 (see FIG. 2). Oil hole 24 is opened in second flank face 20 (see FIG. 2). Oil hole 23 and oil hole 24 extend from front end 100*a* toward rear end 100*b* while being twisted along with a twist of flute 11 and flute 12 inside drill 100. Oil hole 23 and oil hole 24 do not need to be formed in drill 100.

Figure 6:
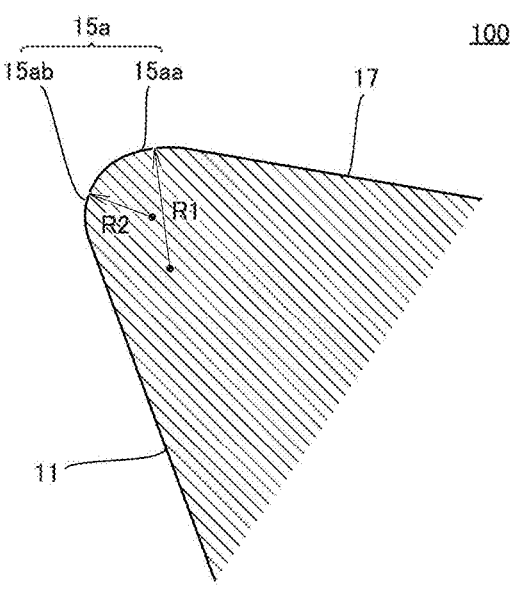
FIG. 6 is a sectional view taken along line VI-VI in FIG. 2.

FIG. 6 is a sectional view taken along line VI-VI in FIG. 2. FIG. 6 shows a cross section orthogonal to an extending direction of main cutting edge 15*a*. As shown in FIG. 6, main cutting edge 15*a* has a first curved portion 15*aa* and a second curved portion 15*ab* in a sectional view orthogonal to the extending direction of main cutting edge 15*a*. First curved portion 15*aa* is contiguous with first flank face 17. Second curved portion 15*ab* is contiguous with flute 11. First curved portion 15*aa* and second curved portion 15*ab* have a curved shape in a sectional view orthogonal to the extending direction of main cutting edge 15*a*. First curved portion 15*aa* and second curved portion 15*ab* preferably have a partial arc shape in a sectional view orthogonal to the extending direction of main cutting edge 15*a*. In an example shown in FIG. 6, first curved portion 15*aa* and second curved portion 15*ab* are contiguous with each other.

A curvature radius of first curved portion 15*aa* is defined as a first curvature radius R1. A curvature radius of second curved portion 15*ab* is defined as a second curvature radius R2. First curvature radius R1 is larger than second curvature radius R2. First curvature radius R1 is preferably 1.5 times or more of second curvature radius R2 and 0.07 mm or less. Second curvature radius R2 is preferably 0.02 mm or more and 0.05 mm or less. First curvature radius R1 and second curvature radius R2 are only required to be measured at any position on main cutting edge 15*a*. First curvature radius R1 does not need to be constant within a range of first curved portion 15*aa*, and second curvature radius R2 does not need to be constant within a range of second curved portion 15*ab*. In this case, when a minimum value of first curvature radius R1 is larger than a maximum value of second curvature radius R2, a relationship in which "first curvature radius R1 is larger than second curvature radius R2" is satisfied.

Figure 7:
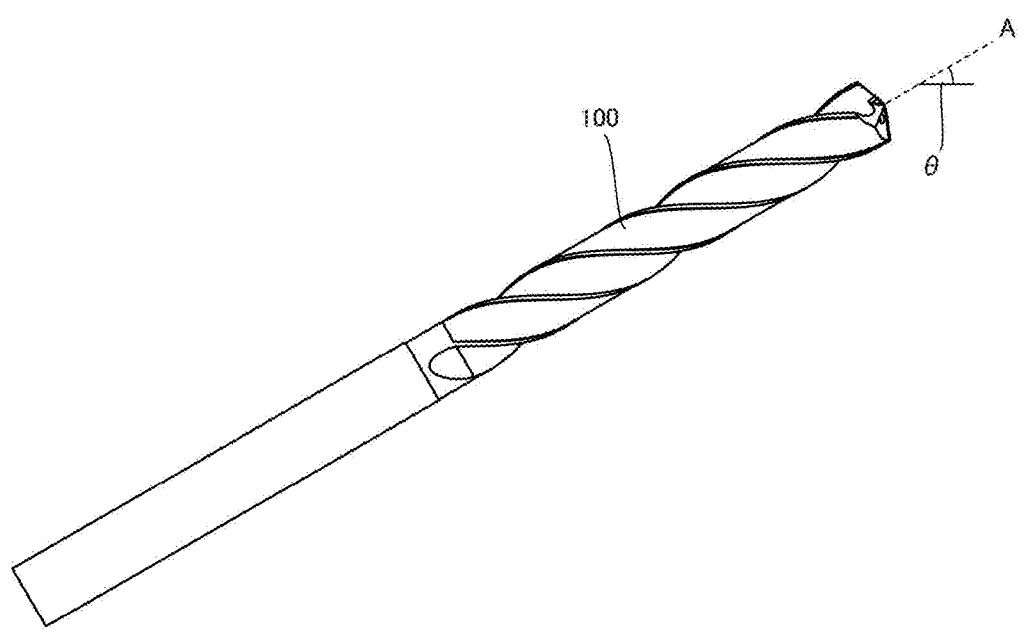
FIG. 7 is a first schematic view illustrating a method of measuring a first curvature radius R1 and a second curvature radius R2.

Hereinafter, a method of measuring first curvature radius R1 and second curvature radius R2 will be described. FIG. 7 is a first schematic view illustrating the method of measuring first curvature radius R1 and second curvature radius R2. As shown in FIG. 7, when first curvature radius R1 and second curvature radius R2 are measured, firstly, drill 100 is disposed to be inclined with respect to a horizontal direction. Assuming that an angle formed by central axis A and the horizontal direction is an inclination angle θ, drill 100 is disposed so that inclination angle θ is a torsion angle of flute 11 (flute 12)±20°. The torsion angle of flute 11 (flute 12) is an angle formed between an extending direction of flute 11 (flute 12) and central axis A.

Second, a contour near main cutting edge 15*a* is measured by Contracer (C3000 manufactured by Mitutoyo Corporation). A measurement software is FORMTRACEPAK for Windows Version 5.202, and a stylus is a conical stylus (SPH-77/12AAE867 manufactured by Mitutoyo Corporation). A measurement pitch is 1.0 µm, and a measurement speed is 0.02 mm/sec. The measurement pitch is a distance between adjacent measurement points. Contracer is scanned along a direction orthogonal to the extending direction of main cutting edge 15*a* at a measurement position. Third, an intersection point between first curved portion 15*aa* and first flank face 17 and an intersection point between second curved portion 15*ab* and flute 11 are calculated on the basis of the contour described above.

Figure 8:
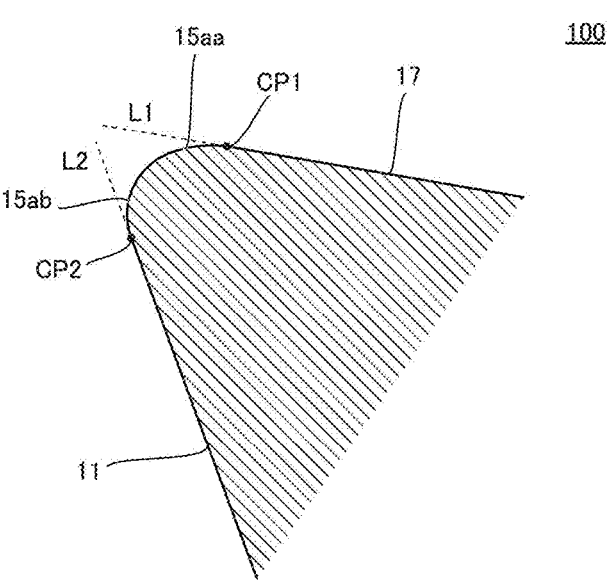
FIG. 8 is a second schematic view illustrating the method of measuring first curvature radius R1 and second curvature radius R2.

FIG. 8 is a second schematic view illustrating the method of measuring first curvature radius R1 and second curvature radius R2. FIG. 8 shows, as an example, a cross section at a position corresponding to VI-VI in FIG. 2. As shown in FIG. 8, a straight line parallel to first flank face 17 and 1 µm away from first flank face 17 toward inside of drill 100 is defined as a first virtual straight line L1. A straight line parallel to a part of flute 11 contiguous with main cutting edge 15*a* (that is, a rake face of main cutting edge 15*a*) and 1 µm away from the part toward inside of drill 100 is defined as a second virtual straight line L2. An intersection point between first virtual straight line L1 and the contour is regarded as an intersection point between first curved portion 15*aa* and first flank face 17 (first intersection point CP1), and an intersection point between second virtual straight line L2 and the contour is regarded as an intersection point between second curved portion 15*ab* and flute 11 (second intersection point CP2).

Fourth, first curvature radius R1 and second curvature radius R2 are calculated on the basis of the contour between first intersection point CP1 and second intersection point CP2. Specifically, first, a curvature center of a curve indicated by 20 measurement points closest to first intersection point CP1 is calculated on the basis of a least squares method. Next, an average value of distances between the curvature center and each of the 20 measurement points closest to first intersection point CP1 is calculated. This average value is first curvature radius R1. Second curvature radius R2 is calculated in a similar manner. That is, a curvature center of a curve indicated by 20 measurement points closest to second intersection point CP2 is calculated on the basis of the least squares method, and an average value of distances between each of the 20 measurement points and the curvature center is second curvature radius R2.

Although not shown, main cutting edge 16*a* has the same configuration as main cutting edge 15*a*. Specifically, in a sectional view orthogonal to main cutting edge 16*a*, main cutting edge 16*a* includes first curved portion 16*aa* having a curved shape (partial arc shape) contiguous with first flank face 19, and second curved portion 16*ab* having a curved shape (partial arc shape) contiguous with flute 12. A curvature radius of first curved portion 16*aa* is larger than a curvature radius of second curved portion 16*ab*. The curvature radius of first curved portion 16*aa* is preferably 1.5 times or more of the curvature radius of second curved portion 16*ab* and 0.07 mm or less, and the curvature radius of second curved portion 16*ab* is preferably 0.2 mm or more and 0.05 mm or less.

Modifications

Figure 9:
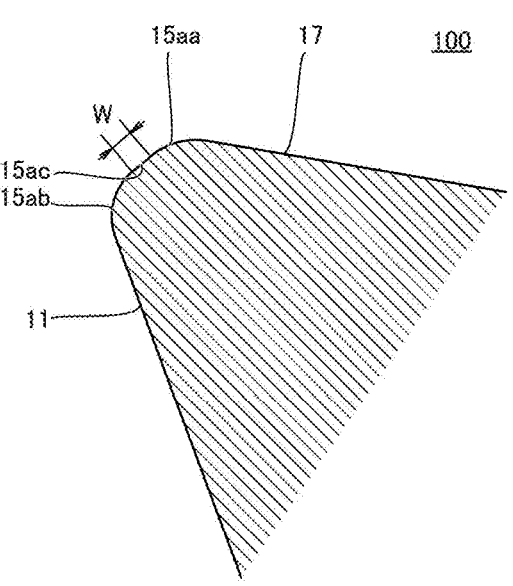
FIG. 9 is a sectional view of drill 100 according to a modification.

FIG. 9 is a sectional view of drill 100 according to a modification. FIG. 9 shows a cross section at a position corresponding to VI-VI in FIG. 2. As shown in FIG. 9, main cutting edge 15*a* may further include a connecting portion 15*ac* in a sectional view orthogonal to the extending direction of main cutting edge 15*a*. Connecting portion 15*ac* is contiguous with first curved portion 15*aa* and second curved portion 15*ab*. Connecting portion 15*ac* has, for example, a linear shape in a sectional view orthogonal to the extending direction of main cutting edge 15a. In this case, a width W of connecting portion 15ac is preferably 0.05 mm or less. Connecting portion 15ac may have a curved shape (partial arc shape) in a sectional view orthogonal to the extending direction of main cutting edge 15a. In this case, a curvature radius of connecting portion 15ac is larger than first curvature radius R1.

(Cutting Processing Using Drill 100)

Hereinafter, cutting processing using drill 100 will be described.

Cutting processing using drill 100 is performed by bringing cutting edge 15 and cutting edge 16 into contact with a workpiece while rotating drill 100 about central axis A. At this time, a feed rate per edge is preferably 5% or more of an edge diameter D of drill 100. Edge diameter D is a circumscribed circle of cutting edge 15 (cutting edge 16) in a front view as viewed from front end 100a (see FIG. 2). The feed rate per edge is, for example, 8% or less of edge diameter D. Drill 100 is used, for example, for cutting processing for carbon steel such as S50C.

(Effects of Drill 100)

Hereinafter, effects of drill 100 will be described in comparison with drills according to comparative examples.

In the drill according to Comparative Example 1, round honing with a constant curvature radius is performed on main cutting edge 15a. In a drill according to Comparative Example 2, first curvature radius R1 is smaller than second curvature radius R2. In other respects, a configuration of the drill according to Comparative Example 1 and a configuration of the drill according to Comparative Example 2 are common to the configuration of drill 100.

In the drill according to Comparative Example 1, when a width for performing cutting edge processing is determined, a curvature radius of the round honing is naturally determined. The width for performing the cutting edge processing also affects chip processability and cutting resistance, and thus cannot be excessively increased. Accordingly, in the drill according to Comparative Example 1, the width for performing the cutting edge processing cannot be increased in terms of chip processability and cutting resistance, and as a result, the curvature radius of the round holing cannot be increased. Therefore, strength of main cutting edge 15a becomes insufficient.

In the drill according to Comparative Example 2, unlike the drill according to Comparative Example 1, first curvature radius R1 and second curvature radius R2 are not naturally determined by the width for performing the cutting edge processing. However, as a result of intensive studies by the present inventor, when the drill according to Comparative Example 2 is used for cutting processing under a high-feed cutting condition, chipping is likely to occur on first flank face 17.

In drill 100, unlike the drill according to Comparative Example 1, first curvature radius R1 and second curvature radius R2 are not naturally determined by the width for performing the cutting edge processing. In addition, in drill 100, since the curvature radius of main cutting edge 15a is larger on the flank face (that is, first curvature radius R1 is larger than second curvature radius R2), chipping less likely occurs on first flank face 17 even when drill 100 is used for cutting processing under a cutting condition of high feed.

When conditions of second curvature radius R2×1.5≤first curvature radius R1≤0.07 mm and 0.02 mm≤second curvature radius R2≤0.05 mm are satisfied in drill 100, chipping is further less likely to occur on first flank face 17. In addition, when main cutting edge 15a of drill 100 further includes connecting portion 15ac, it is easy to adjust the width for performing the cutting edge processing.

Examples

Hereinafter, a cutting test performed to confirm the effects of drill 100 will be described.

In the cutting test, samples 1 to 5 were used as drill samples. In samples 1 and 2, first curvature radius R1 was smaller than second curvature radius R2. Specifically, in sample 1, first curvature radius R1 and second curvature radius R2 were 0.024 mm and 0.065 mm, respectively, and in sample 2, first curvature radius R1 and second curvature radius R2 were 0.029 mm and 0.079 mm, respectively.

In sample 3, round honing with a constant curvature radius was performed on main cutting edge 15a. The curvature radius was 0.042 mm. In samples 4 and 5, first curvature radius R1 was larger than second curvature radius R2. That is, samples 4 and 5 correspond to drill 100. Specifically, in sample 4, first curvature radius R1 and second curvature radius R2 were 0.045 mm and 0.0314 mm, respectively, and in sample 5, first curvature radius R1 and second curvature radius R2 were 0.060 mm and 0.028 mm, respectively. In samples 1 to 5, edge diameter D was 8 mm.

In the cutting test, cutting processing of the workpiece was performed by using samples 1 to 5. The workpiece for the cutting processing was S50C. The cutting processing was performed by using NV5000α1A/40 manufactured by DMG MORI CO., LTD. The cutting processing was performed by forming a through hole having a depth of 38 mm under the conditions of a cutting speed of 140 m/min and a feed rate per edge of 0.40 mm/rev (5% of edge diameter D). During the cutting processing, coolant was supplied from oil hole 23 and oil hole 24. A cutting life of each sample was evaluated by a cutting distance until chipping occurred on first flank face 17. It was considered that chipping occurred on first flank face 17 when an area of a chip generated on first flank face 17 was 0.00025 mm$^2$ or more. A life of each sample was an average value of n=2.

[Table 1]

TABLE 1

| | First curvature radius R1 (mm) | Second curvature radius R2 (mm) | Cutting distance (m) |
|---|---|---|---|
| Sample 1 | 0.024 | 0.065 | 46 |
| Sample 2 | 0.029 | 0.079 | 55 |
| Sample 3 | Round honing with curvature radius = 0.042 mm | | 89.8 |
| Sample 4 | 0.045 | 0.0314 | 109 |
| Sample 5 | 0.060 | 0.028 | 109 |

As shown in Table 1, cutting lives of samples 4 and 5 were superior to cutting lives of samples 1 to 3. As described above, first curvature radius R1 is larger than second curvature radius R2 in samples 4 and 5, but this condition is not satisfied in samples 1 to 3. From this comparison, it has become clear that, by making first curvature radius R1 larger than second curvature radius R2, chipping is less likely to occur on first flank face 17 even when the cutting processing is performed under a cutting condition of high feed.

It should be understood that the embodiments disclosed herein are illustrative in all respects and not restrictive. The scope of the present invention is defined not by the above embodiments but by the claims and is intended to include meanings equivalent to the claims and all modifications within the scope.

REFERENCE SIGNS LIST

10: outer peripheral face, 11: flute, 12: flute, 13: land, 13*a*: leading edge, 13*b*: heel, 13*c*: main margin, 13*d*: sub margin, 13*e*: body clearance, 14: land, 14*a*: leading edge, 14*b*: heel, 14*c*: main margin, 14*d*: sub margin, 14*e*: body clearance, 15: cutting edge, 15*a*: main cutting edge, 15*aa*: first curved portion, 15*ab*: second curved portion, 15*ac*: connecting portion, 15*b*: thinning cutting edge, 16: cutting edge, 16*a*: main cutting edge, 16*aa*: first curved portion, 16*ab*: second curved portion, 17: first flank face, 18: second flank face, 19: first flank face, 20: second flank face, 21: thinning face, 21*a*: thinning heel face, 21*b*: thinning rake face, 22: thinning face, 22*a*: thinning heel face, 22*b*: thinning rake face, 23, 24: oil hole, 100: drill, 100*a*: front end, 100*b*: rear end, A: central axis, CP1: first intersection point, CP2: second intersection point, D: edge diameter, L1: first virtual straight line, L2: second virtual straight line, R1: first curvature radius, R2: second curvature radius, W: width

The invention claimed is:

1. A drill comprising:

a flank face;

a rake face; and a main cutting edge on a ridgeline between the rake face and the flank face, wherein the main cutting edge includes a first curved portion having a curved shape contiguous with the flank face, a second curved portion having a curved shape contiguous with the rake face and a connecting portion having a linear shape contiguous with the first curved portion and the second curved portion in a sectional view orthogonal to an extending direction of the main cutting edge, the first curved portion has a first curvature radius that is larger than a second curvature radius of the second curved portion, and the connecting portion has a width of less than 0.05 mm.

2. The drill according to claim 1, wherein the first curvature radius is 1.5 times or more of the second curvature radius and 0.07 mm or less, and the second curvature radius is 0.02 mm or more and 0.05 mm or less.

3. A cutting method comprising performing cutting processing of a workpiece with a drill, wherein the drill includes a flank face, a rake face, and a main cutting edge on a ridgeline between the rake face and the flank face, the main cutting edge includes a first curved portion having a curved shape contiguous with the flank face, a second curved portion having a curved shape contiguous with the rake face, and a connecting portion having a linear shape contiguous with the first curved portion and the second curved portion in a sectional view orthogonal to an extending direction of the main cutting edge, the first curved portion has a first curvature radius that is larger than a second curvature radius of the second curved portion, and the cutting processing is performed under a condition that a feed rate per edge of the drill is 5% or more of an edge diameter of the drill per revolution, and the connecting portion has a width of less than 0.05 mm.

4. The cutting method according to claim 3, wherein the feed rate per edge of the drill is 5% or more and 8% or less of the edge diameter of the drill per revolution.

* * * * *